(No Model.) 4 Sheets—Sheet 1.

F. WESTERMAN.
MACHINE FOR FORMING LOAVES OF DOUGH.

No. 407,978. Patented July 30, 1889.

WITNESSES:
Fredk. H. Mills
J. B. Carpenter

INVENTOR
F. Westerman
BY Price & Fisher
His ATTORNEY (No Model.) 4 Sheets—Sheet 2.

F. WESTERMAN.
MACHINE FOR FORMING LOAVES OF DOUGH.

No. 407,978. Patented July 30, 1889.

Witnesses
Fred H. Mills.
J. B. Carpenter.

Inventor
F. Westerman
By His Attorneys (No Model.) 4 Sheets—Sheet 3.

F. WESTERMAN.
MACHINE FOR FORMING LOAVES OF DOUGH.

No. 407,978. Patented July 30, 1889.

Witnesses
Fred. H. Mills.
J. B. Carpenter.

Inventor
F. Westerman
By His Attorneys (No Model.) 4 Sheets—Sheet 4.
F. WESTERMAN.
MACHINE FOR FORMING LOAVES OF DOUGH.
No. 407,978. Patented July 30, 1889.
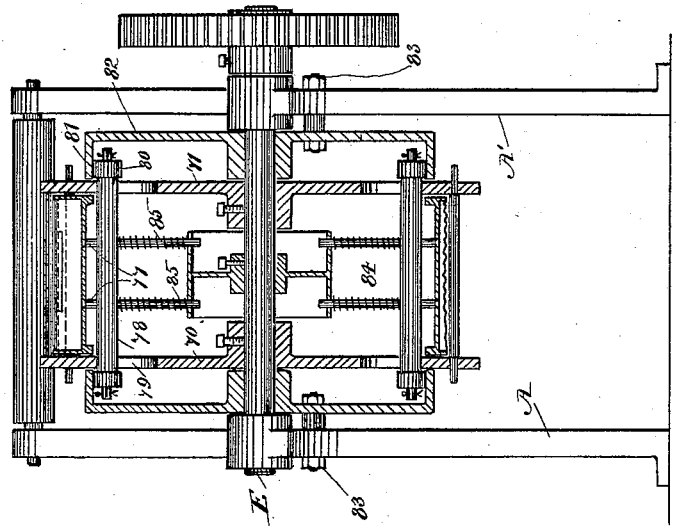
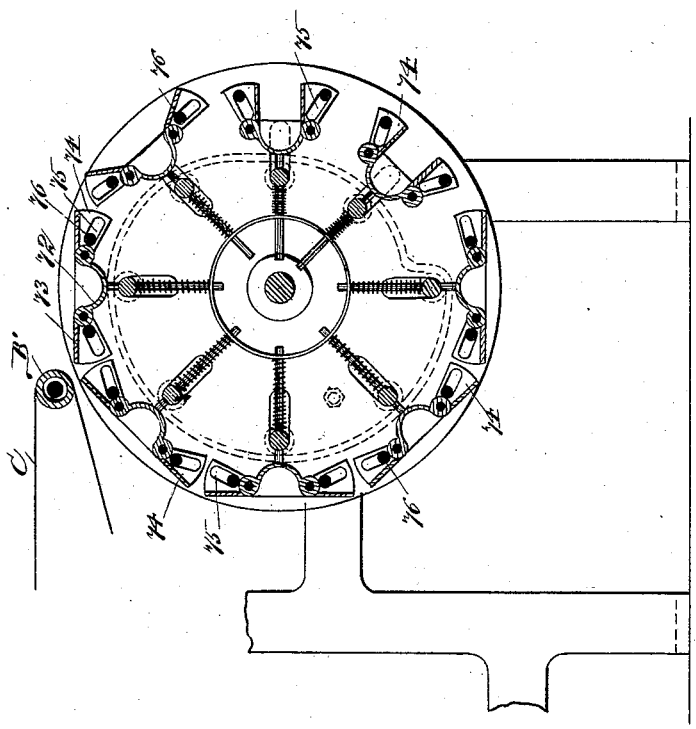
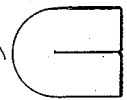

UNITED STATES PATENT OFFICE.

FREDERICK WESTERMAN, OF CHICAGO, ILLINOIS.

MACHINE FOR FORMING LOAVES OF DOUGH.

SPECIFICATION forming part of Letters Patent No. 407,978, dated July 30, 1889.

Application filed July 9, 1888. Serial No. 279,379. (No model.)

*To all whom it may concern:*

Be it known that I, FREDERICK WESTERMAN, a citizen of the United States, residing at Chicago, in the county of Cook and State of Illinois, have invented certain new and useful Improvements in Machines for Forming Loaves of Dough, of which I do declare the following to be a full, clear, and exact description, reference being had to the accompanying drawings, forming part of this specification.

In the manufacture of bread it is a well-recognized fact that a better baking of the dough can be effected when the loaves are formed of one or more layers folded or superposed instead of being formed of a homogeneous mass of dough, and it has therefore become the practice of bakers in the manufacture of the better qualities of bread to first roll the dough into a flat layer-strip and then cut from such strip a section and fold it over upon itself one or more times until it assumes the proper shape for the loaf.

The object of my present invention is to provide improved mechanism whereby the operation of forming the loaves of dough can be effected; and to this end my invention consists in the novel features of construction hereinafter described, illustrated in the accompanying drawings, and particularly pointed out in the claims at the end of this specification.

Figure 2:
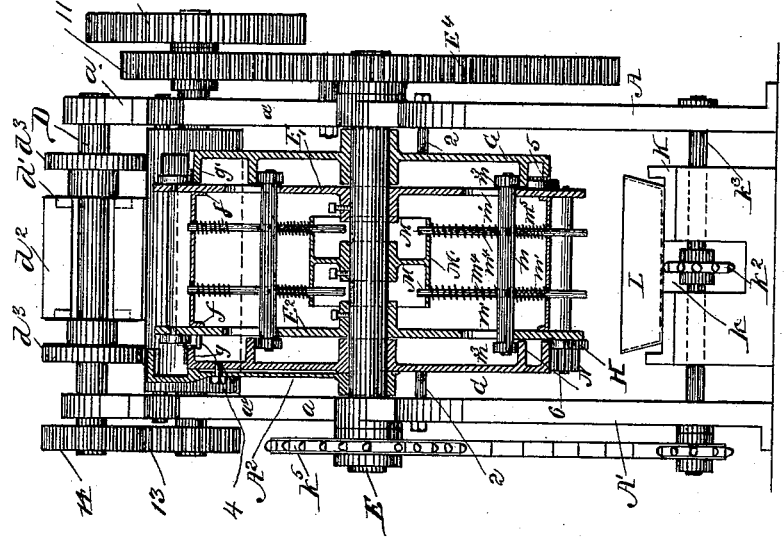
Figure 1:
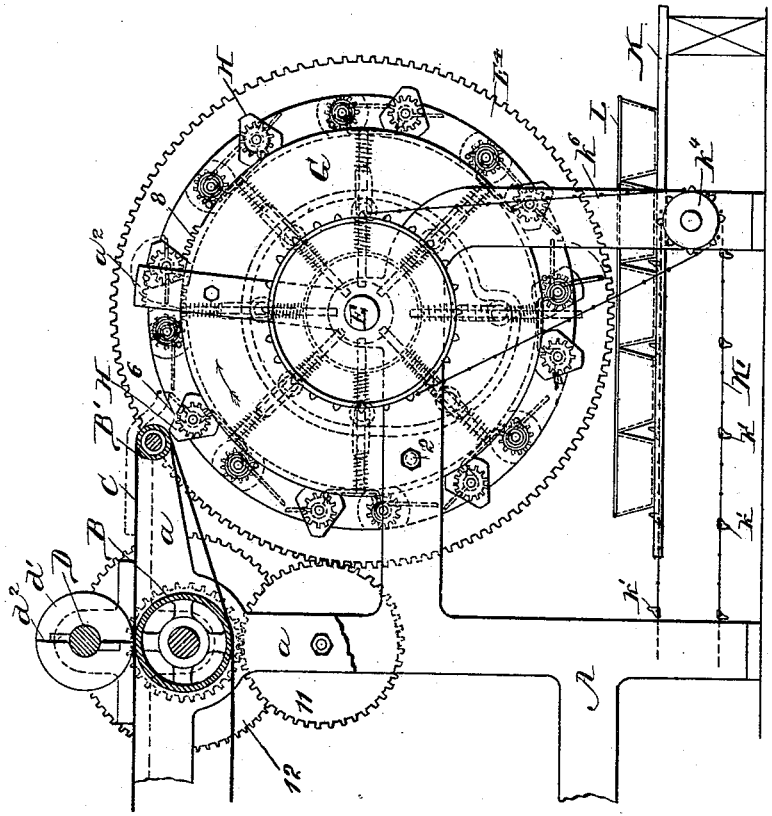
Figure 3:
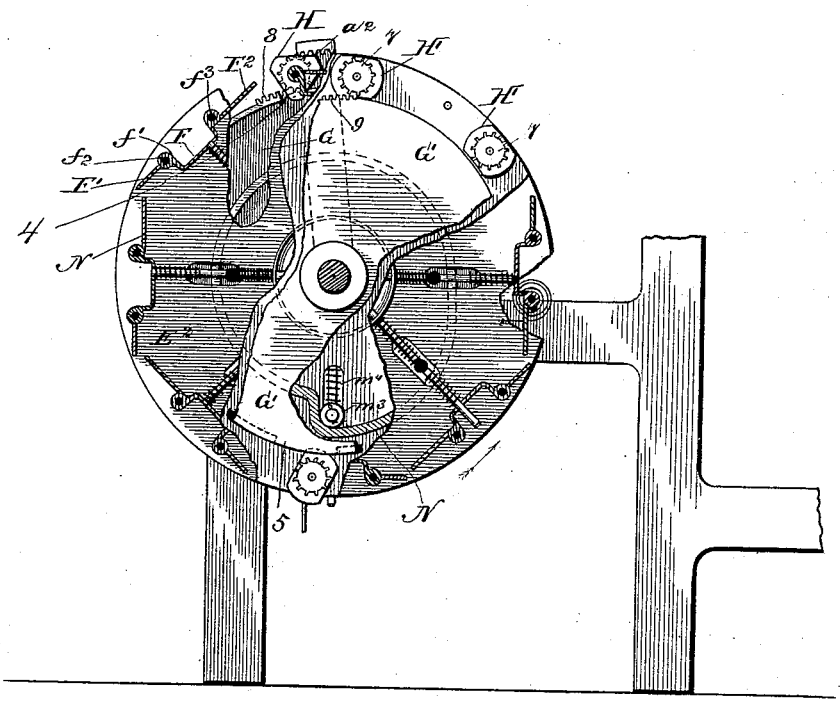
Figure 4:
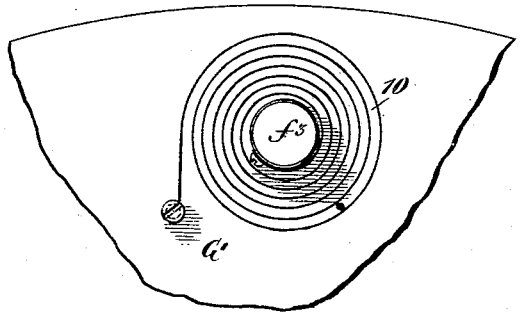
Figure 5:
Figure 7:
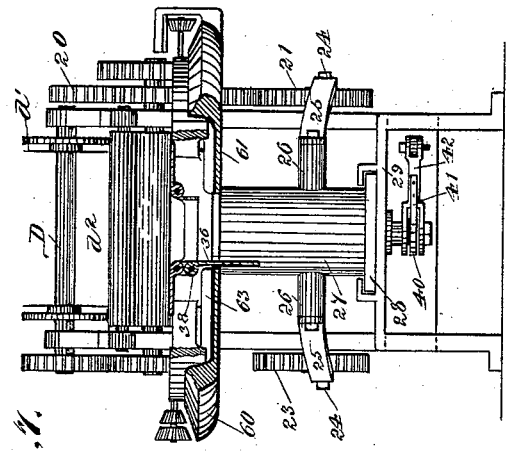
Figure 6:
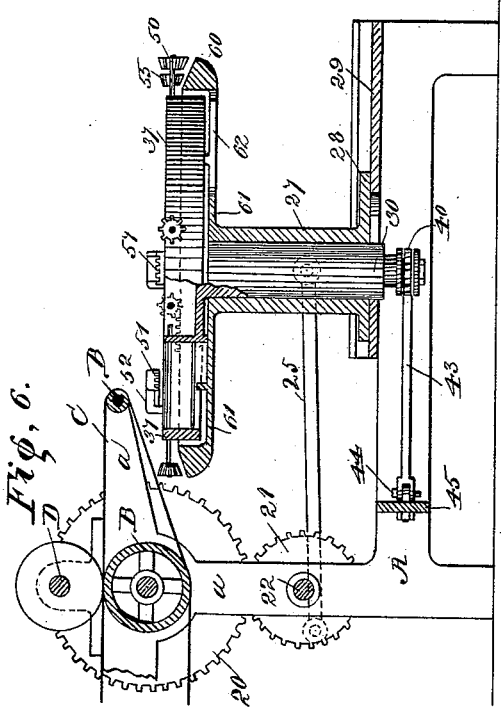
Figure 8:
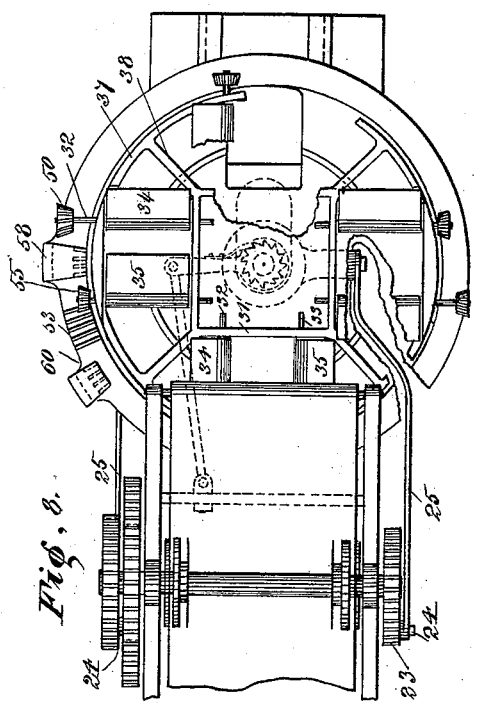

Figure 1 is a view in side elevation of one form of machine embodying my invention, parts being shown in vertical section. Fig. 2 is a view in central transverse section through Fig. 1. Fig. 3 is a view similar to Fig. 1, but taken from the opposite side of the machine, parts being broken away and parts being shown in vertical section for the purpose of better illustration. Fig. 4 is an enlarged detail view of a portion of one of the side plates and a turning-rod and operating-spring. Fig. 5 is an end view illustrating the form of loaf of dough made upon the machine illustrated in Figs. 1, 2, and 3. Fig. 6 is a view in vertical longitudinal section through another form of machine embodying my invention, parts being shown in side elevation and parts being broken away for the purpose of better illustration. Fig. 7 is an end view of the machine illustrated in Fig. 6, portions being broken away. Fig. 8 is a plan view, with portions broken away, of the machine illustrated in Figs. 6 and 7. Fig. 9 is a view in vertical longitudinal section of another form of machine embodying my invention. Fig. 10 is a view in vertical transverse section through the machine illustrated in Fig. 9. Fig. 11 is an end view showing the shape of the loaf of dough made by the machine illustrated in Figs. 9 and 10.

Referring particularly to the construction illustrated in Figs. 1 to 4 of the drawings, A and A' designate the sides of the main frame, between the upper extensions or standards $a$ of which is journaled the drum B and the pulley B', over which passes the feed or delivery belt C, of well-known or suitable construction. In the drawings a portion only of this belt is shown, but the manner in which such feed-belt is sustained is so well understood by the mechanic as not to require particular illustration or description. Above and across the belt C extends the cutter-shaft D, that is journaled in suitable boxes $d$ on the sides of the main frame, and upon this shaft is fixed the disk-knives $d'$ and the axial knives $d^2$, which serve to sever from the long layer or strip of dough upon the carrier-belt C a section of the proper size or shape to be folded into a loaf. Upon the shaft D are also fixed the guide-rollers $d^3$, which coact with the drum B in securing the uniform movement of the feed-belt C beneath the cutter-knives.

Between the sides A and A' of the main frame and sustained thereby extends the main or central shaft E, upon which are fixed the disks or plates E' and $E^2$, that sustain between their peripheral portions the several pans or receptacles in which the loaves of dough will be successively formed. In the construction shown in Figs. 1, 2, and 3 of the drawings each of these pans or receptacles consists of a bottom plate F, having its flanged edges $f$ fastened to the rotary disks or plates E' and $E^2$ and its ends $f'$ bent upward, and of inwardly-folding sides or wings F' and $F^2$, that are fixed, respectively, upon the rods $f^2$ and $f^3$, that pass through disks or plates E' and $E^2$ near the edges.

It will be observed that the several receptacles are set at such distances apart that the folding sides or wings of one receptacle will not interfere with those of the adjacent ones. At the sides of the plates E' and E², and bolted, as at 2, to the sides of the main frame, are held the guide-plates G and G', through which the central shaft E loosely passes. At their peripheries the guide-plates G and G' are provided, respectively, with the inwardly-turned flanges $g$ and $g'$, upon which bear the edges of the guide-blocks H and H', that are fixed to the ends of the rods $f^2$ and $f^3$ and serve to hold the folding sides or wings F' and F² in their open or closed positions. Thus by reference to Figs. 1 and 3 it will be seen that the pan or receptacle immediately beneath the pulley B' of the delivery-belt has its sides or wings F' and F² opened outwardly, and in this position the side F' will be held by the bearing of the guide-block H upon the flange $g$ of the guide-plate G, which flange prevents the block H from rotation, and consequently checks the movement of the rod $f^2$ and the side F'. In like manner, also, the guide-block H' will be guarded against movement by the flange $g'$ of the guide-plate G', and will hold the rod $f^3$ and the folding side or wing F² against rotation.

It will be observed that the flange $g$ of the plate G is cut away, as at 4, and that the flange $g'$ of the plate G' is cut away, as at 5, the purpose of thus cutting away the flanges being to permit the folding sides or wings F' and F² to be rotated, and it is obvious that at the points where the flanges are cut away the guide-blocks H and H' will no longer check the turning of the wings or sides. The turning of the folding sides or wings F' and F² is effected by the mechanism next to be described. Upon the end of each rod $f^2$, on which a wing F' is fixed, is keyed a cog-wheel 6, and upon the end of the rod $f^3$ is keyed the cog-wheel 7, that serves to effect the turning of the folding side or wing F², that is fixed to this rod.

It will be observed that the folding side or wing F' is narrower than the side or wing F², the purpose of which arrangement will presently appear.

Upon the flange $g$ of the guide-plate G is formed the segmental rack 8, and upon the flange $g'$ of the guide-plate G' is formed the segmental rack 9. On the main shaft E is set the arm or bar A², that is preferably bolted to the side plate E', as shown at $a'$, the upper end of this arm A² being bent over, as shown, and being provided with a segmental rack $a^2$. The segmental racks 8 and $a^2$ co-operate with the cog-wheels 6 in effecting the turning movement of the sides or wings F', while the turning of the sides or wings F² is effected by means of the segmental rack 8 and by means of a coiled spring 10, (see Fig. 4,) one end of which is attached to the rod $f^3$, while its opposite end is attached to the outer face of the guide-plate G'. Upon the main drive-shaft E is keyed the large gear-wheel E⁴, that engages with a gear-wheel 11, that is journaled in the main frame and receives rotation from a gear-wheel 11ª upon the shaft that carries the drum B, this shaft being provided also with a driving-gear 12 and with a cog-wheel 13, that engages the cog-wheel 14 upon the cutter-shaft D.

From the construction as thus far defined it will be seen that if the parts be in the position shown in Fig. 1 of the drawings and motion be imparted to the gear-wheel E⁴ the pans or receptacles will be brought successively beneath the pulley B' of the endless carrier-belt C and will receive the sections of dough as they are severed from the main strip or layer by the rotary cutter-knives. Assuming a section of dough to have been severed by the knives and to have been delivered, as shown by dotted lines in Fig. 1, it is apparent that as the pans or receptacles are moved the section of dough will be laid upon the folding sides F' and F² and the bottom F of the receptacle immediately beneath the pulley B'. As the rotation of the gear-wheel E⁴ and consequent movement of the receptacle continue, the cog-wheel 6, that is fixed to the end of the rod $f^2$, will first contact with the segmental rack $a^2$ of the arm A², and as the flange $g$ of the guide-plate G is cut away, as at 4, opposite this segmental rack, the cog-wheel 6, the rod $f^2$, the guide-block H, and the folding side F' will be turned as the cog-wheel moves beneath the fixed segmental rack $a^2$, thus causing the side or wing F' to fold that part of the layer of dough held thereon over upon the part of the layer of dough within the bottom F of the pan. As the cog-wheel 6, having made this first fold of the dough, passes from beneath the segmental rack $a^2$ it will engage with the teeth of the segmental rack 8 upon the flange $g$ of the guide-plate G, and as the cog-wheel moves over this segmental rack it will cause the rotation of the rod $f^2$, the guide-block H, and the folding side or wing F', so as to again restore it to the open position, as shown in Fig. 1. As the cog-wheel 6 thus passes out of engagement with the segmental rack $a^2$, the cog-wheel 7, that is fixed to the end of the rod $f^3$, will engage with the teeth of the segmental rack 9 upon the flange $g'$ of the guide-plate G', and as this cog-wheel passes over the teeth of the segmental rack it will cause the rod $f^3$, the guide-blocks H', and the folding side or wing F² to be turned, thus folding the layer of dough that rested upon the side or wing F² over onto the layer of dough previously turned or folded by the side or wing F'.

It will be seen that the flanges $g$ and $g'$ of the guide-plates G and G' are cut away at points opposite the several segmental racks, so as to permit the guide-blocks H and H' to be rotated, and it will also be seen that the flange $g'$ of the guide-plate G' is cut away, as shown at 5, so that when the guide-block H' reaches this point the coiled spring 10, that has been previously wound by the turning of the rod $f^3$ as the wing F² was folded inward, will be free to unwind, and will thus turn backward the rod $f^3$ and will fold outward the side or wing $F^2$, as shown in Fig. 1 of the drawings. Hence it is plain that in the passage of each pan or receptacle from the carrier-belt C to the lower part of the periphery of the guide-plates G and G' the dough that has been received will be twice folded and caused to assume the shape shown in Fig. 5 of the drawings.

Beneath the several receptacles in which the loaves of dough are formed extends a table K, whereon will travel the pans L, that receive the loaves of dough as they are delivered in folded condition from the receptacles, and this table K is preferably provided with a slot $k$, along which will travel an endless sprocket-chain K', provided with lags or studs $k'$, that passes over the sprocket-wheel $k^2$, this sprocket-wheel $k^2$ receiving its rotation from a shaft $k^3$, that is geared with the main drive-shaft E through the medium of the sprocket-wheels $k^4$ and $k^5$ and sprocket-chain $k^6$. From this construction it will be seen that the pans will be successively caught by the lags or studs $k'$ on the chain or belt K', and will be advanced successively into proper position to receive the loaves of dough as they are discharged from the pans or receptacles in which they are formed.

In order to effect the discharge of the dough with certainty and at the proper time from the pans or receptacles, I provide the bottoms F of the pans with perforations, through which pass the ends of the discharge-rods M, the inner ends of these rods passing through the circular frame or cylinder M', that is keyed to the main drive-shaft and moves in unison with the pans. These discharge-rods M are preferably arranged in pairs, each pair being attached to a transverse bar $m$, that extends through the vertical slots $m'$, formed in the sides of the plates E' and E² and carrying the friction-rollers $m^3$, that engage with the inner side of the cam-shaped ribs N, that are formed upon the inner face of the plates E' and E². Upon the discharge-rods M are placed the two sets of coiled springs $m^4$ and $m^5$, the springs $m^4$ tending to force the rods outward, so as to cause the friction-rollers $m^3$ to travel at all times against the face of the cam-ribs N, and the springs $m^5$ serving as a cushion for the bar $m$ as it passes off from the shoulders $n$ of the cam-shaped ribs N at the lower portion of such ribs. From this construction it will be seen that during the operation of delivering the dough into the pans or receptacles and of folding the layers of dough therein the discharge-rods M will be in retracted position by reason of the cam-ribs N forcing the transverse bar $m$ inward against the compression-spring $m^4$, and the discharge-rods will thus remain retracted until the pans are revolved to their lowest position and immediately above the delivery or baking pans L, when the discharge-rods will be forced suddenly outward by the compression-springs $m^4$ and will cause the folded loaves of dough to be successively discharged into the appropriate pans beneath them. It is obvious that this sudden outward movement of the discharge-rods can be readily effected, as the cam-ribs N are provided with abrupt shoulders at their lower portions to permit a freedom of movement to the rods at such point. After the loaves of dough have been thus discharged and the rotation of the pans continues it is apparent that the friction-rollers $m^3$ will ride against the face of the cam-ribs N and will cause the discharge-rods M to be gradually retracted.

In the modification illustrated in Figs. 6, 7, and 8 of the drawings the carrier-belt C is sustained by a drum B and a pulley B', that is carried by the extension $a$ of the main frame A in the same manner as in the construction illustrated in Figs. 1, 2, and 3 of the drawings, and a cutter-shaft D, provided with radial and axial knives $d'$ and $d^2$, is also employed. In this construction, however, the outer end of the shaft of the drum B is provided with a large gear-wheel 20, that engages with a gear-wheel 21, fixed upon the shaft 22, that carries at its opposite end a gear-wheel 23. From the outer face of each of the gear-wheels 21 and 23 projects a wrist-pin 24, from which extend the connecting-rods 25, the opposite ends of these rods being attached to arms or studs 26, that project from the outer sides of the sliding post 27, the base 28 of this sliding post being sustained upon the flanged table 29, that extends between the sides of the main frame.

The sliding post 27 is hollow, and through it extends the central vertical shaft 30, that serves to impart rotation to the several pans into which the dough will be delivered from the carrier-belt C, and the upper end of this shaft 30 is provided with a rectangular chamber 31, through which passes the ends of the rods 32 and 33, whereon the folding sides or wings 34 and 35 of the pans or receptacles will be held, the outer ends of these rods being sustained by the rim 37, that is connected, as shown, by bars 38 with the rectangular chamber 31. In this construction those portions of the rim 37 adjacent the folding sides or wings 34 and 35 are preferably flattened, and between such portions of the rim 37 and the outer faces of the chamber 31 are held the bottoms 36 of the pans wherein the loaves of dough will be formed. These bottoms 36 are pivoted at one side to the rim 37 and the chamber 31 by means of suitable rods 38, as more particularly shown in Fig. 7 of the drawings, so that at the proper time the bottoms may be dropped in order to permit the discharge of the loaves from the pans. Upon the lower end of the main shaft 30 is fixed a ratchet-wheel 40, with which engages a pawl 41, that is carried by the yoke 42, loosely held upon the shaft, and from the outer end of this yoke extends the rod 43, that is pivotally connected, as at 44, to the transverse bar 45 of the main frame. From this construction it will be seen that when movement is imparted to the gear-wheels 20, 21, and 23 and through the connecting-rods 25 to the sliding post 27 the pawl 41 will ride freely over the ratchet-wheel 40, and as the sliding post moves outward will not effect any movement of the main shaft 30 or of the pans carried thereby. When, however, the sliding post is drawn inward by the connecting-rods 25 the pawl 41 will engage with the teeth of the ratchet-wheel 40 and will cause a partial rotation of the central shaft 30 sufficient to bring the next pan or receptacle in position beneath the delivery-belt C to receive its section of dough.

It is apparent that as the dough is delivered upon the sides 34 and 35 and the bottom 36 of each receptacle the receptacle is moved in outward direction, and it will be seen that during the backward movement of the sliding post 27 and during the partial rotation of the central shaft 30 the folding of the dough will be effected in the following manner: A beveled cog-wheel 50, that is carried upon the end of the rod 32, will first engage with a segmental rack 51, that is carried by the bracket 52, and as the cog-wheel passes beneath this segmental rack the side or wing 34 will be folded downward and will cause the portion of dough thereon to be turned over upon the part of the dough within the bottom 36 of the pan or receptacle. As the cog-wheel 50 passes away from the segmental rack 51 it will engage with the segmental rack 53, formed upon the rim 60 of the table 61, that extends from the top of the sliding post 27, and by thus engaging with the segmental rack 53 the cog-wheel 50 will be turned in reverse direction, and will cause the side or wing 34 to be again turned outward and away from the dough. When the side or wing 34 has been thus turned outward and the cog-wheel 50 has passed out of engagement with the segmental rack 53, the cog-wheel 55, that is fixed to the end of the rod 33, that carries the folding side or wing 35, will pass into engagement with the segmental rack 53, and will cause the side or wing 35 to be turned downward and to fold its layer of dough over onto the layer of dough previously turned downward by the side or wing 34. As the cog-wheel 55 passes out of engagement with the segmental rack 53 it will engage with a segmental rack 57, that is carried by the standard 58, and by thus engaging with this rack will be caused to turn in the opposite direction, and thus turn outwardly the folding side or wing 35. In the table 61 is formed a cut-away space 62 of a size equal to or slightly larger than the bottoms 36 of pans, and by reference to Fig. 7 it will be seen that when the pans are revolved to a point opposite this opening 62 of the table the free ends of the bottoms 36 will drop, and thus permit the loaves of dough to be discharged. It will be understood, of course, that suitable baking-pans or receptacles will be provided beneath the open space 62 of the table 61 to receive the loaves of dough as they are thus discharged. As the pans revolve beyond the open space 62 of the table 61 the bottom 36 of each pan will contact with the annular rib 63 upon the upper face of the table, and will be held by such rib in horizontal position until it is again brought opposite the open space 62 of the table.

In the construction of machine illustrated in Figs. 9 and 10 of the drawings the sections of dough will be delivered by an endless belt C, passing over a front pulley B' in the manner hereinbefore described. The machine illustrated in Figs. 9 and 10 is designed to give a single fold to the sections of dough in order to form the loaf in substantially the shape illustrated in Fig. 11. In the sides A and A' of the main frame is journaled the main shaft E, upon which is fastened the side plates 70 and 71, between the peripheral portions of which plates are movably sustained the pans wherein the loaves of dough will be formed. In this construction each pan consists of the concave bottom portion 72, to which are hinged the folding sides or wings 73, these sides or wings being provided with flanges 74, in which are formed the long slots 75, that receive the rods 76, projecting inwardly from the sides of the plates 70 and 71.

To the bottom 72 of each pan are fastened the outer ends of the operating-rods 77, that are affixed to a transverse rod 78, the ends of which pass through the long slot 79 in the side plates 70 and 71, and are provided at their ends with friction-rolls 80, that bear upon the under side of the cam-ribs 81, that project inwardly from the face of the plates 82, through which the shaft E loosely passes, and which are suitably bolted, as at 83, to the main frame. The inner ends of the operating-rods 77 project through the cylinder 84, that is keyed to the main shaft E and moves in unison with the plates 70 and 71, and upon each of these operating-rods is placed a coil-spring 85, that bears upon the transverse bar 78 and upon the cylinder 84 and serves to press the transverse bar normally in outward direction, so that the friction-rolls 80 shall travel against the inner face of the cam-ribs 81. From this construction it will be seen that the sections of dough to be folded will be delivered by the endless belt C onto the bottom and sides 72 and 73, which comprise the receiving-pans, and as these pans are rotated by the turning of the main shaft E it will be seen that the friction-rolls 80, bearing against the inner face of the cam-ribs 81, will cause the bottom portion 72 of the pans to be drawn inward, and will cause the sides or wings 73 to be gradually drawn toward each other until each of the sections of dough is caused to assume the shape illustrated in Fig. 11 of the drawings. When, however, the friction-rolls 80 reach the abrupt shoulder at the lower portion of the cam-ribs 82, the transverse bars 78 will be forced outward by the coiled springs 85 and the operating-rod 77, and will cause the sides or wings 73 of the pins to be opened out and will discharge the dough into suitable baking pans or receptacles that will be provided for the purpose. As the side plates 70 and 71 continue to revolve the sides or wings 73 will remain thus opened or extended until they receive new sections of dough, and will again be moved toward each other in the manner just described. It will be readily understood that the baking-pans may be caused to travel beneath the pans or receptacles in which the loaves of dough are formed in the same manner as illustrated in Figs. 1 and 2 of the drawings, or the loaves of dough may be discharged into any convenient form of pans or receptacles suitably presented beneath the side plates 70 and 71 and the revolving pans.

While I have presented in this application certain generic claims embracing broadly features of construction common to the several different forms of machines above described, I do not wish to be understood as claiming specifically in this application the receptacle for shaping the loaf having a movable bottom portion and folding sides, as illustrated in Figs. 9 and 10 of the drawings, nor as claiming herein the combination, with a rotary frame, of a series of receptacles having movable bottoms and folding sides and suitable guides for said sides, as such constructions are specifically claimed in an application filed by me December 15, 1888, Serial No. 293,742; nor do I wish to be understood as claiming in this application any features of invention that are specifically claimed in said last-mentioned application.

Having thus described my invention, what I claim as new, and desire to secure by Letters Patent, is—

1. In a machine for forming loaves of dough, a receptacle for shaping the loaf having folding wings or portions adapted to double or fold over the layer of dough, substantially as described.

2. In a machine for forming loaves of dough, a series of movable receptacles having folding wings adapted to double or fold over the layer of dough, substantially as described.

3. In a machine for forming loaves of dough, a series of movable receptacles having centrally-folding wings adapted to double or fold over the layer of dough, substantially as described.

4. In a machine for forming loaves of dough, a series of movable receptacles having fixed bottoms and centrally-folding wings adapted to double or fold over the layer of dough, substantially as described.

5. In a machine for forming loaves of dough, a series of receptacles having fixed bottoms and having wings hinged to the sides of said receptacles, substantially as described.

6. In a machine for forming loaves of dough, the combination, with a suitable delivery-belt, of a series of movable receptacles having folding wings adapted to double or fold on the layer of dough, substantially as described.

7. In a machine for forming loaves of dough, the combination, with a series of movable receptacles having inwardly-folding wings or portions adapted to double or fold over the layer of dough, of a central shaft for bringing said receptacles successively into position to be filled, substantially as described.

8. In a machine for forming loaves of dough, a series of receptacles having folding wings adapted to double or fold over the layer of dough, in combination with a series of rods to which said wings are connected, cog-wheels fixed upon said rods, and suitable segmental racks for turning said cog-wheels, substantially as described.

9. In a machine for forming loaves of dough, the combination, with a series of movable receptacles having folding wings adapted to double or fold over the layer of dough, of pivot-rods on which said wings are fastened and guard-blocks for temporarily guarding said rods against rotation, substantially as described.

10. In a machine for forming loaves of dough, the combination, with a series of movable receptacles having folding wings adapted to double or fold over the layer of dough, of pivot-rods for turning said wings, guide-blocks affixed to said pivot-rods for temporarily checking the movement thereof, and suitable flanged plates whereon said guide-blocks will ride, said plates being provided with cut-away spaces to permit the guide-blocks to rotate, substantially as described.

FREDERICK WESTERMAN.

Witnesses:
 Geo. P. Fisher, Jr.,
 I. B. Carpenter.